United States Patent [19]
Kron

[11] 4,059,909
[45] Nov. 29, 1977

[54] NEURAL RECEPTOR AUGMENTED G SEAT SYSTEM

[75] Inventor: Gerald Joseph Kron, Binghamton, N.Y.

[73] Assignee: The Singer Company, Binghamton, N.Y.

[21] Appl. No.: 496,131

[22] Filed: Aug. 9, 1974

Related U.S. Application Data

[63] Continuation of Ser. No. 224,763, Feb. 9, 1972, abandoned.

[51] Int. Cl.² .............................................. G09B 9/08
[52] U.S. Cl. .................................. 35/12 E; 35/12 H; 297/DIG. 3; 297/180
[58] Field of Search ................. 35/12 E, 12 H, 12 W, 35/12 P, 12 R; 5/348 WB, 349; 297/DIG. 3, 180, 284

[56] References Cited

U.S. PATENT DOCUMENTS

| | | | |
|---|---|---|---|
| 2,938,570 | 5/1960 | Flajole | 5/349 X |
| 3,097,436 | 7/1963 | Gaucher | 35/12 E |
| 3,097,436 | 7/1963 | Gaucher | 35/12 E |
| 3,136,577 | 6/1964 | Richard | 297/180 |
| 3,148,391 | 9/1964 | Whitney | 297/DIG. 3 |
| 3,270,440 | 9/1966 | Radosevic, Jr. | 35/12 E |
| 3,279,201 | 10/1966 | Wortz et al. | 35/12 E |
| 3,300,878 | 1/1967 | Butcher et al. | 35/12 E |
| 3,309,795 | 3/1967 | Helmore | 35/12 E |
| 3,317,934 | 5/1967 | Hinrichs | 5/349 |

FOREIGN PATENT DOCUMENTS

| | | | |
|---|---|---|---|
| 979,495 | 1/1965 | United Kingdom | 35/12 E |

OTHER PUBLICATIONS

*Modeling of the Human Force and Motion Sensing Mechanisms;* a thesis by Don R. Gum, E.E.; The Ohio State University; 1972; pp. i, 68, 78–82.

*Primary Examiner*—James T. McCall
*Attorney, Agent, or Firm*—James C. Kesterson; Jeffrey Rothenberg

[57] ABSTRACT

An improved "G" seat system for use in aircraft simulators in which the motion associated with "G" forces is simulated by a plurality of individually controllable air cells which make up the seat and back, and the feeling of seat hardness is simulated by a plurality of firmness cells placed atop the air cells to come in contact with the seat occupant is shown. In another embodiment heat exchangers are placed in the firmness pads in the tuberosity region and used to further simulate pressure change by using temperature change.

21 Claims, 11 Drawing Figures

| MANEUVER / COMMAND | SEAT PAN | | | | | | | | | | | | | | | | | | | | BACK PAN | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 1 | 2 | 3 | 4 | 5 |
| STRAIGHT PULL UP | -2 | -2 | -2 | -2 | -2 | -3 | -3 | -2 | -2 | -2 | -2 | -2 | -2 | -3 | -3 | -2 | -2 | -2 | -2 | -2 | -1 | -1 | -1 | -2 | -2 |
| DIVE PULL OUT | -4 | -4 | -4 | -4 | -4 | -5 | -5 | -4 | -4 | -4 | -4 | -4 | -4 | -5 | -5 | -4 | -4 | -4 | -4 | -4 | -2 | -2 | -2 | -3 | -3 |
| DIVE OUT OF CLIMB | +2 | +2 | +2 | +2 | +3 | +3 | +3 | +3 | +3 | +3 | +3 | +3 | +3 | +3 | +3 | +3 | +2 | +2 | +2 | +2 | +3 | +3 | +3 | +3 | +3 |
| UNCOORD.TURN RIGHT – LEVEL | +1 | +1 | +1 | +1 | +1 | +1 | +1 | +1 | 0 | 0 | 0 | 0 | 0 | -1 | -1 | -1 | -1 | -1 | -1 | -1 | +1 | +1 | 0 | 0 | 0 |
| UNCOORD.TURN LEFT – CLIMB | -2 | -2 | -3 | -3 | -1 | -1 | -1 | -2 | -2 | +1 | -1 | -1 | 0 | 0 | -1 | -1 | -1 | +1 | 0 | 0 | 0 | -2 | -1 | -1 | -1 |
| POWER DOWN, BRAKES ETC. | 0 | 0 | 0 | +1 | -2 | -1 | 0 | 0 | 0 | -1 | 0 | +1 | -2 | -1 | 0 | +1 | -1 | 0 | 0 | 0 | +1 | +1 | +2 | +1 | +1 |

| MANEUVER / COMMAND | BACK PAN | | | | THIGH EXCURSION | | | | | FIRMNESS CELLS | | | | | | BELT & HARNESS | | | | HEAT EXCHGR |
|---|---|---|---|---|---|---|---|---|---|---|---|---|---|---|---|---|---|---|---|---|---|
| | 6 | 7 | 8 | 9 | R1 | R2 | R3 | L1 | L2 | L3 | R1 | R2 | L1 | L2 | SR | SL | BR | BL | RB | LB | RS | LS |
| STRAIGHT PULL UP | -2 | -1 | -1 | -1 | +1 | +1 | +1 | +1 | +1 | +1 | +3 | +3 | +3 | +3 | +4 | +4 | +3 | +3 | +1 | +1 | +2 | +2 | R L |
| DIVE PULL OUT | -3 | -2 | -2 | -2 | +2 | +2 | +2 | +2 | +2 | +2 | +4 | +4 | +4 | +4 | +5 | +5 | +4 | +4 | +2 | +2 | +3 | +3 | H H |
| DIVE OUT OF CLIMB | +3 | +3 | +3 | +3 | -3 | -3 | -3 | -3 | -3 | -3 | -2 | -2 | -2 | -2 | -3 | -3 | -3 | -3 | -2 | -2 | -3 | -3 | C C |
| UNCOORD.TURN RIGHT – LEVEL | 0 | -1 | -1 | -1 | +3 | +3 | -3 | -3 | -3 | -3 | -3 | -3 | -3 | -3 | -4 | -4 | -3 | -3 | +2 | +2 | -2 | -2 | C H |
| UNCOORD.TURN LEFT – CLIMB | 0 | 0 | 0 | 0 | 0 | -2 | +1 | -1 | 0 | +1 | +2 | +3 | +4 | +5 | -3 | -4 | -3 | -3 | -3 | +1 | -1 | -1 | H C |
| POWER DOWN, BRAKES ETC. | +2 | +1 | +1 | +2 | -1 | 0 | +1 | -1 | 0 | +1 | +3 | +3 | -3 | -1 | 0 | 0 | -3 | -3 | -3 | +1 | +1 | +1 | 0 0 |

NOTES:
1. NUMBERS GIVEN ARE REFERENCED TO MAXIMUM CAPABILITY OF ±5.
2. FOR AIR & FIRMNESS CELLS + IS INCREASED PRESSURE, – IS DECREASED PRESSURE.
3. FOR BELT & HARNESS + IS SLACKENING, – IS TIGHTENING.
4. ZERO REPRESENTS THAT STATUS EMPLOYED FOR ONE G AT REST CONDITIONS.

FIG. 11

NEURAL RECEPTOR AUGMENTED G SEAT SYSTEM

The invention herein described was made in the course of or under a contract thereunder, with the Department of the Air Force.

This is a continuation, of application Ser. No. 224,763, filed Feb. 9, 1972, abandoned.

BACKGROUND OF THE INVENTION

This invention relates to flight simulation in general and more particularly to an improved G seat system.

It is well known that one of the factors contributing to man's analysis of the acceleration profiles he is subjected to is his assessment of body motion and pressure sensation. In the case of the seated subject such as the pilot of an aircraft or the operator of a surface-based vehicle, this analysis is conducted normally while the subject is seated and is based on body excursion within the seat and pressure sensations arising from seat/body forces as perceived by the pressure sensitive neural receptors located in the buttocks area.

In the past, simulation efforts requiring the capability of inducing a sensation of motion as an informational cue have approached the problem in terms of large motion systems capable of subjecting not only the subject, but his immediate environment (cabin, cockpit, etc.) to motion profiles, the conceptual origins of which are founded on various philosophies concerning the manner in which to impart motion sensation, under very constrained means, via stimulating the semi-circular canals of the inner ear.

This approach is aimed primarily at providing informational cues via the inner ear; consequential bodily motion within the seat and buttock pressure variation are second order by-products of reduced magnitude and usefulness.

In some cases, depending upon the type of motion system drive philosphy employed, the second order effects are less than useful, in fact erroneous.

Basic G seats have been developed to emphasize the above-mentioned second order effects and make use of this source of motion-oriented information transfer. For example, see U.S. Pat. Nos. 3,270,440 and 3,097,436. These G seats use the bladder or air cell approach wherein the seat pan and seat back are divided into a number of individually controlled motion cells, the pressure of each being separately controlled to provide a means of moving the body within the seat frame. Side cushions composed of a number of cells are sometimes employed to provide outside thigh pressure inducing a sense of lateral acceleration or roll-orientation. Actuator controlled seat belts and shoulder strap harness complete the complement of motion cue inducing mechanisms. The neural receptor augmented G seat system of the present invention embodies and builds upon this very approach.

A cursory inspection of the above approach can lead to the basically erroneous assumption that both motion cue sources, body excursion within the seat and buttocks pressure sensation, are employed advantageously with the air cell or bladder approach; both sources of motion sensation are employed but not advantageously. In fact the two cue sources are in direct disagreement with one another.

Consider the case of the seated subject being accelerated upwards (acceleration vector directed from buttocks towards head). Under this condition, the subject should settle in his seat; his buttocks should assume a lower position with respect to the arm rests, for instance, than that normally experienced under at-rest, one G conditions. Simultaneously, the increased inertial loading on the upper torso is transmitted to the seat via the buttocks and increased pressure, particularly in the area of the flesh trapped between the seat and the ischial tuberosity bone structure, should be experienced. Similar flesh pressure increases under the ischial region are noted in the at-rest one G condition when a hard seat is chosen over a soft seat. The soft seat conforms more readily to buttock shape and lessens pressure concentrations under the tuberosities. A hard seat which does not conform so readily to buttocks shape increases flesh pressure under the tuberosity protrusions. Therefore, in the acceleration case under consideration, the subject may feel that the seat has become "harder."

Now consider the responses available with the air cells or bladder G seat when it is desired to simulate the above acceleration. In order to cause the subject to settle in his seat, the air bladder pressure is initially reduced resulting in the desired body excursion of settling deeper in the seat. However the air cells or bladders change shape under the pressure reduction and become more pliable and consequently fit the natural form of the buttock more precisely thereby relieving flesh pressure on the tuberosity region. As described above, increased tuberosity region pressure, not decreased pressure, is desired in this situation.

Likewise, consider the opposite maneuver when the induced acceleration is downward (from head towards buttocks). This maneuver might be characterized by the body/seat motion resulting when aircraft drop in air pockets or when a pilot goes "over the top" in an outside loop. The body should lift in the seat and inertial loading of the upper torso should cause flesh pressure in the tuberosity region to decrease. The simulation of this maneuver requires that the seat air cells be inflated to cause the body to be lifted in the seat. The inflation process causes the air cells to become less pliable, more firm, and the surface of the seat does not match as closely the natural form of the buttock resting upon it thereby increasing, rather than decreasing, the flesh pressure in the tuberosity region.

The above examples demonstrate the shortcomings of present air cell or bladder G seat systems. The rationable used in the above-described body/seat/pressure maneuvers; may be extended to other acceleration maneuvers however, the resultant seat response shortcomings are also present.

SUMMARY OF THE INVENTION

The object of the neural receptor augmented G seat system of the present invention is to capitalize on both sources of informational content relating to motion analysis and provide motion cues to the subject in terms of not only body excursion but also pressure sensation.

The neural receptor augmented G seat system is constructed in such a form as to eliminate the erroneous cue generation described above and to cause both the body excursion cue source and the flesh pressure cue source to be compatible at any point in time thereby permitting these two cue sources to reinforce one another.

The seat system also provides a third cue source, that of heat source and sink. Four types of neural receptors have been identified as associated with skin sensations: Pain, pressure, cold, and heat; each is activated by its respective stimulus. Information exists, however, indicating that the presence of one stimulus in a small area will activate the neural receptors pertaining to another sensation. Surface regions subjected to high flesh pressure have been referred to as "hot spots" which tend to substantiate an interrelationship between pressure stimulus activating not only pressure neural receptors but also heat neural receptors. It is believed that, if the conscious or subconscious sensation of heat is normally associated with the conscious sensation of pressure, the presence of heat stimulus alone may induce a heightened sensation of pressure over and above that warranted by the actual pressure stimulus. Artificially controlling spot temperature therefore would permit variation of apparent or perceived pressure. To this end two small heat exchangers are built into the surface of the seat at the region most often occupied by the tuberosity protrusions.

BRIEF DESCRIPTION OF THE DRAWING

FIG. 10 is a chart of sample maneuvers illustrating the activation of the individual air cells, firmness cells, belts and heat exchangers.

FIG. 11 is a key to the chart of FIG. 10 identifying the components.

DESCRIPTION OF THE PREFERRED EMBODIMENT

Figure 1:
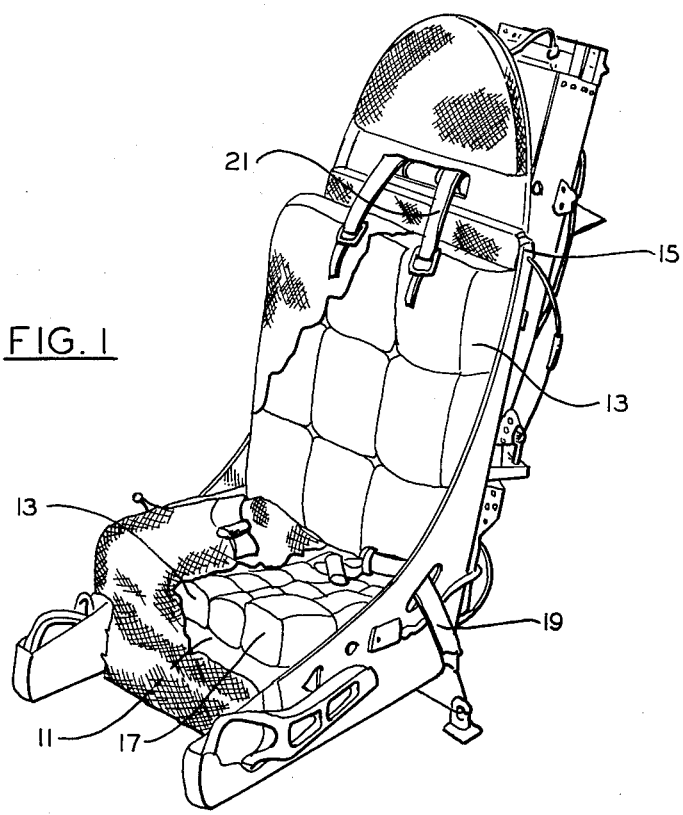
FIG. 1 is a perspective view of a preferred embodiment of the G seat of the present invention.

The basic seat is depicted in FIG. 1. For components comprise the basic seat. A seat supporting structure or pan 11 supports, for example, 20 air cells or bladders 13 arranged in a four (deep) by five (wide) matrix covering a 16 × 16 square inch surface area. Each air cell contains an internal spring to aid in offloading the basic one G weight on the subject, and permit direct pressure control.

A back supporting structure or pan 15 supports nine of the aforementioned air cells 13 arranged in a three by three matrix covering a 16 × 24 square inch area.

Two side cushions 17 are located on the left and right side, and protruding above the top, of the seat pan cushion such that their inflation will cause pressure to be exerted on the outside of the respective thigh. Each side cushion, in this embodiment, employs three air cells. These portions of the seat will not be described in great detail since the basic methods of constructing and inflating the cells are described in the above-referenced patents.

A lap belt 19 and shoulder harness 21 are linked to actuators (two for the lap belt and two for the shoulder harness) such that the belt may be contracted or expanded from either one or both sides of the seat and the shoulder harness straps may be contracted or expanded individually from the top of the seat.

The foregoing comprise the basic structure and form of the seat. The air cells and actuators are pneumatically actuated individually by variable pressure sources to be described below. The pressure sources are governed by servo valve mechanisms which respond to command signals such as directed by computer command, for example, and provided through digital to analog linkages. Such a computer determines desired cell pressure in accordance with a model which receives acceleration and seat attitude data input and converts this to a complement of signals which control cell pressures and belt-harness tensions which will force the subject to a seat position comparable to that experienced when the body is subjected to the actual acceleration and attitude conditions. This portion of the design deals then primarily with the excursion of the body within the seat.

Figure 2:
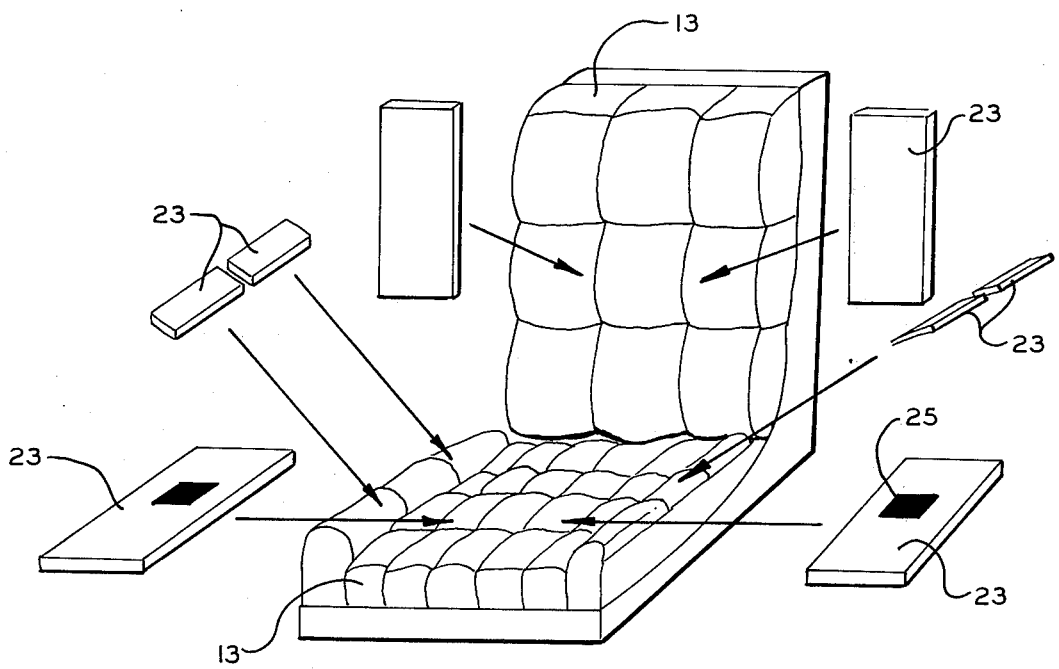
FIG. 2 is a perspective view of the G seat showing construction details.
Figure 3:
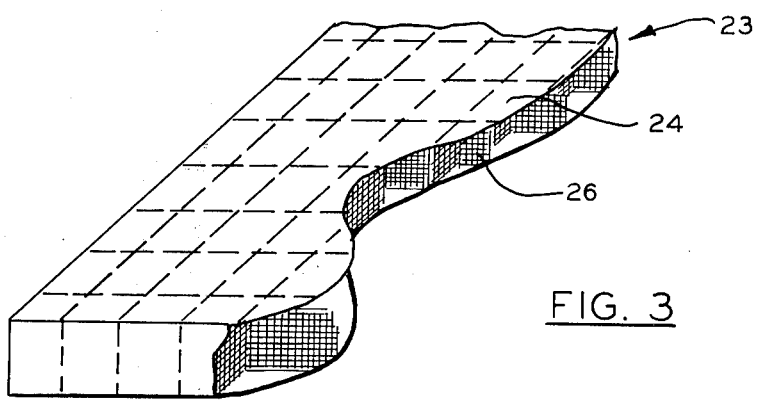
FIG. 3 is a perspective view of one of the seat panels of FIG. 2.

FIG. 2 shows the coverings laid over the seat pan, back pan, and side cushion air cells. This covering 23 shown in detail on FIG. 3 is used in place of normal upholstery. The covering is essentially a series of pancake air bladders and may be constructed of polyethylene or another similar type material 24. The inside structure 26 of the bladders should be divided into small cavities which will maintain structural integrity while permitting free air flow. The internal air circulation between cavities is maximized in a trade-off with maintenance of bladder structural integrity. Any of various methods of construction may be used. For examples see U.S. Pat. No. 2,753,573. These bladders will be referenced as "Firmness Cells" henceforth. As shown eight firmness cells are employed in this embodiment, each to be individually driven with variable pressure servo values under computer control in a manner similar to the air cells described above.

Increasing the air mass in a firmness cell 23 increases its resistance to assume the shape of the body flesh adjacent to or on top of the firmness cell. Decreasing the air mass decreases this resistance. Seat "hardness" and "softness" will be governed with firmness cells 23. The computer program may be modeled such as to correlate proper cues. To use the first example of an acceleration cue directed from buttocks toward head, the program will cause the seat pan air cells 13 to exhaust to a lower pressure and the seat firmness cells 23 to inflate thereby causing the subject to settle in his seat yet feel that the seat has become harder. Examples of coordinated air cell and firmness cell operation for various maneuvers will be described in connection with FIG. 10.

Although the firmness cell alone will greatly improve the simulation, further improvement is possible by including heat exchangers. Heat exchanger mechanisms are constructed in the firmness cells at the two tuberosity protrusion regions 25. The heat exchangers are small pads 27 each approximately two inches square and approximately 3/16 inch thick shown in FIGS. 4 and 5. Methods of heating and cooling may be, but are not limited to, hot and cold fluid, heater elements and cold fluid, bimetalic sheets or twisted wire (thin thermocouple) or any combination thereof. The approach detailed in this application is hot and cold fluid applied to a capillary type pad and heater wire.

Figure 4:
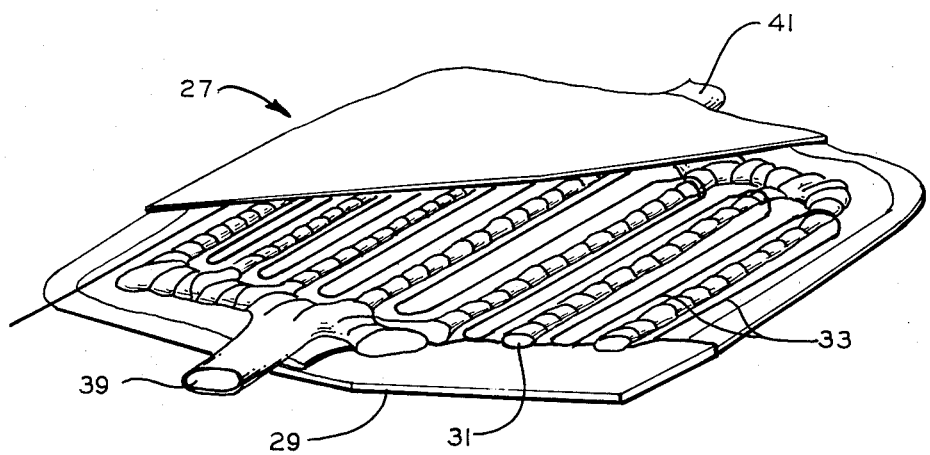
FIG. 4 is a perspective view of a heat exchanger in the panel of FIG. 3.
Figure 5:
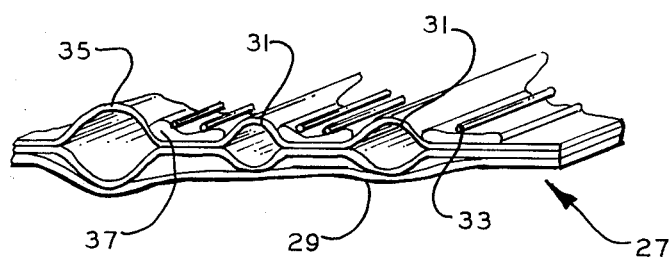
FIG. 5 is a crossection of a portion of FIG. 4.

As shown on FIG. 4 and 5, the pads 27 are made of an outer pouch 29 containing capillaries 31 and heating elements 33. The capillaries 31 are formed by sandwiching a polyethylene material 35. Between the capillaries 31 is placed an insulating material 37 on which the heating elements 33 rest. Fluid may be provided to the capillaries via inlet 39 and will be discharged from opening 41 at the other end of pad 27.

As mentioned above, the sensation of spot warmth may be interpreted as spot pressure. The heat exchangers are used to reinforce the sensation of pressure changes in the buttock flesh immediately below the tuberosity bone structure. The time response of this cue generating device is quite slow and is used primarily only in the generation of long term cues.

Figure 6:
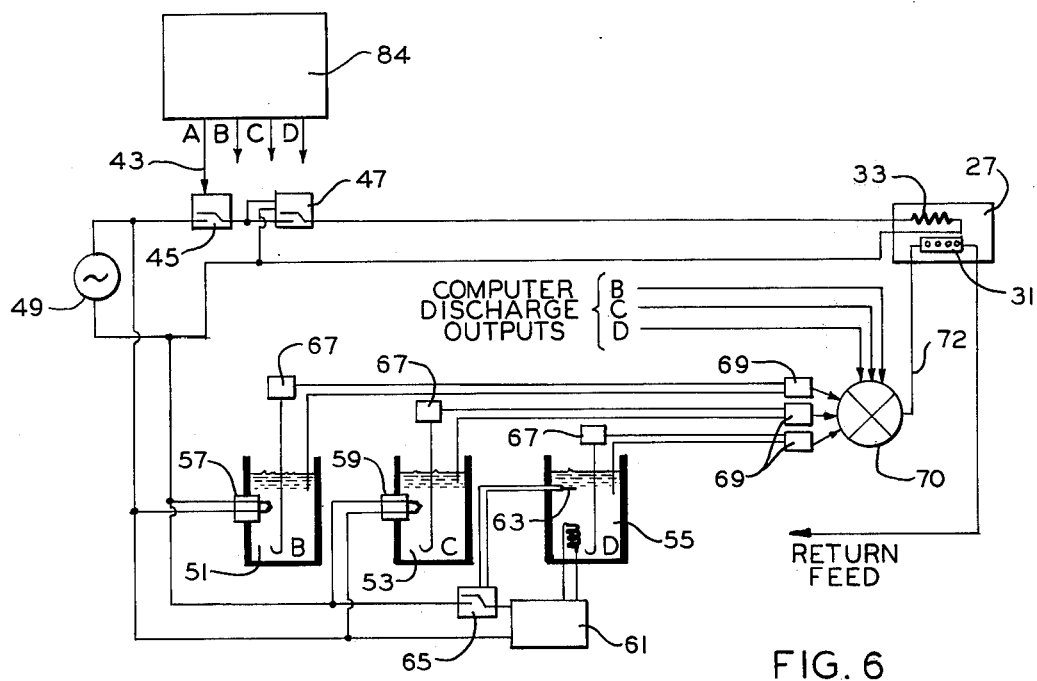
FIG. 6 is a diagram of the preferred embodiment of the heat exchanger control system.

The control system for the heat exchanger is shown in FIG. 6. To make use of the heating elements 33, a control signal of short duration is provided on line 43 by, for example, a computer 84, to activate a relay 45 which in turn activates and latches time delay relay 47. Power from a source 49 is thus supplied to the heating elements 33 for a predetermined time governed by selection of relay 47 after which relay 47 will open. Fluid is supplied to the capillaries 31 from fluid tanks 51, 53 and 55. The fluid in tank 51 is maintained at a temperature above body temperature by a thermostat controlled heater 57. That in tank 53 is maintained at body temperature by a similar heater 59. The fluid in tank 55 is maintained at a temperature below body temperature by a cooler 61 controlled by thermostat 63 and relay 65 in conventional fashion.

Fluid is continuously pumped from the tanks by pumps 67 to pressure relief return valves 69. If fluid is not being used, i.e., if there is no output path for the fluid it will be returned to the tank via this valve 69. The output of valves 69 is provided to a computer controlled three-way analog valve 70 which will be activated to permit fluid from one of the three tanks to circulate to capillaries 31 via line 72 and return to a fluid reservoir (not shown).

Figure 7:
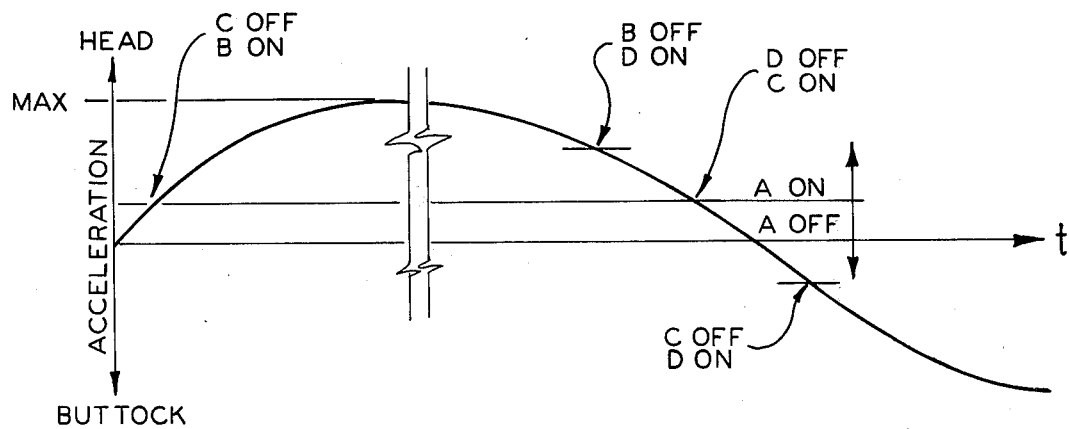
FIG. 7 is an acceleration profile helpful in understanding the operation of the system of FIG. 6.

The operation of the system for a typical acceleration may be better understood by examining FIG. 6 along with FIG. 7. The discrete analog outputs indicated as A, B, C and D on the figures are governed by a computer program the model of which is generated to cause the heating wire to heat if buttock to heat accelerations of sufficient magnitude are detected. The heating wire provides a rapid method of heating the area. The time delay turn off relay terminates heating after a preset passage of time beyond which the benefits of rapid temperature rise are not desired. This is indicated as control signal A on FIG. 6 and 7.

Fluid is cycled through the capillaries at all times. During at rest one "G" conditions the fluid source is that maintained at normal body temperature, i.e., fluid from tank 53 is pumped in response to signal C. During the above-mentioned acceleration cue, the analog valve 70 switches to tank 51 in response to control signal B thus causing a heated fluid to be circulated to capillaries 31 over line 72. Upon detecting that the acceleration profile is returning to the normal one G state, analog valve 70 is commanded by control signal D to first switch to fluid from tank 55 and then by control signal C to switch to fluid from tank 53.

Acceleration cues of the opposite direction are treated in a like manner except subnormal fluid temperatures from tank 55 are employed during cue onset and duration, then sequentially above normal and normal fluid temperatures from tank 51 and 53 respectively, are passed through the capillaries as the acceleration profile returns to normal one G conditions. An example of the type of valve which may be used to switch between tanks is the Exectrol Selector Valve, part no. 21XX1-000-0200 manufactured by Republic Mfg. Co., Cleveland, Ohio.

Individual control of the two heat exchangers permits acceleration cue generation of not only vertical accelerations but also of accelerations possessing lateral components and bank attitude (roll offset).

One of the more promising heat exchanger mechanisms for use with the seat in the tuberosity region are the solid state thermocontrol devices. Small in size, they can be arranged in mosaic form to cover the area required. DC polarity governs the thermal characteristics of these devices. DC current of one polarity causes heating; reversing the polarity causes cooling.

The attractiveness of the solid state approach is the simplicity of incorporation in the firmness cell, ease of control, and absence of complicated and bulky connections between control unit and heat exchanger.

Figure 8:
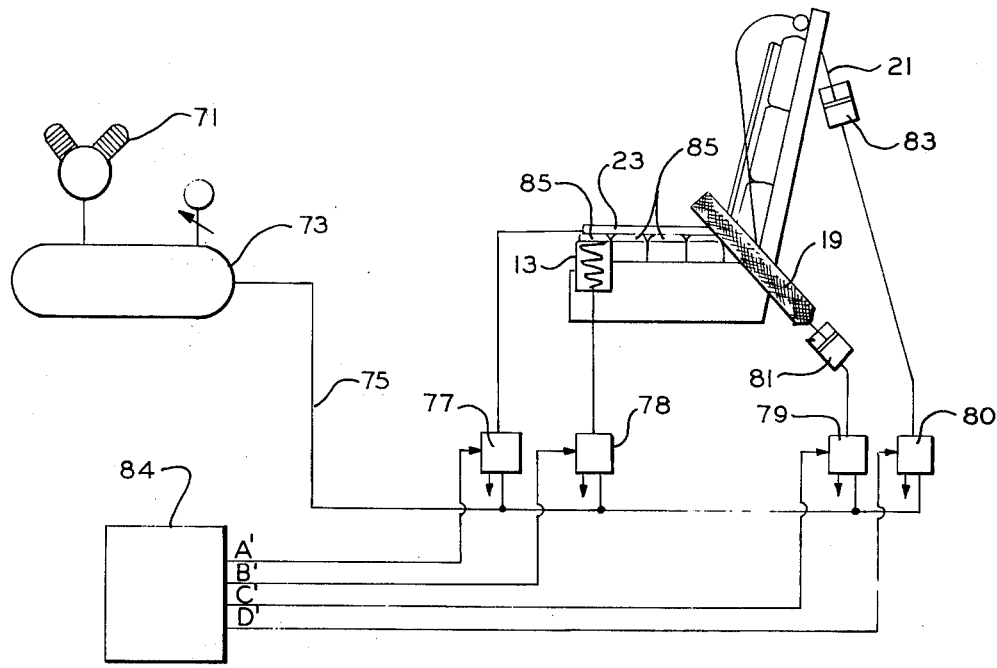
FIG. 8 is a schematic diagram of an air drive for the air cells, firmness cells, and belts.

FIG. 8 illustrates the compressed air system for operating the air cells and firmness cells. A compressor 71 maintains a storage accumulator 73 at the desired pressure. The compressed air is provided over line 75 to a plurality of servo pressure valves 77 through 80. These may be, for example, Electro-Pneumatic Transducers Models T-25, T-28 or T28U manufactured by Conoflow Corp. of Blackwood, New Jersey. These valves will provide a pressure output which is directly proportional to the current input. On the figure only four valves are shown. In the actual G seat system one valve will be provided for each cell and two each for the lap belt and shoulder harness. As illustrated valve 77 provides air to a firmness cell 23, valve 78 to an air cell 13, valve 79 to a piston 81 which is connected to lap belt 19 and valve 80 to a piston 83 connected to shoulder harness 21. The simulator computer 84 provides control signals to the valves designated on the figures as A', B', C', and D'.

Figure 9:
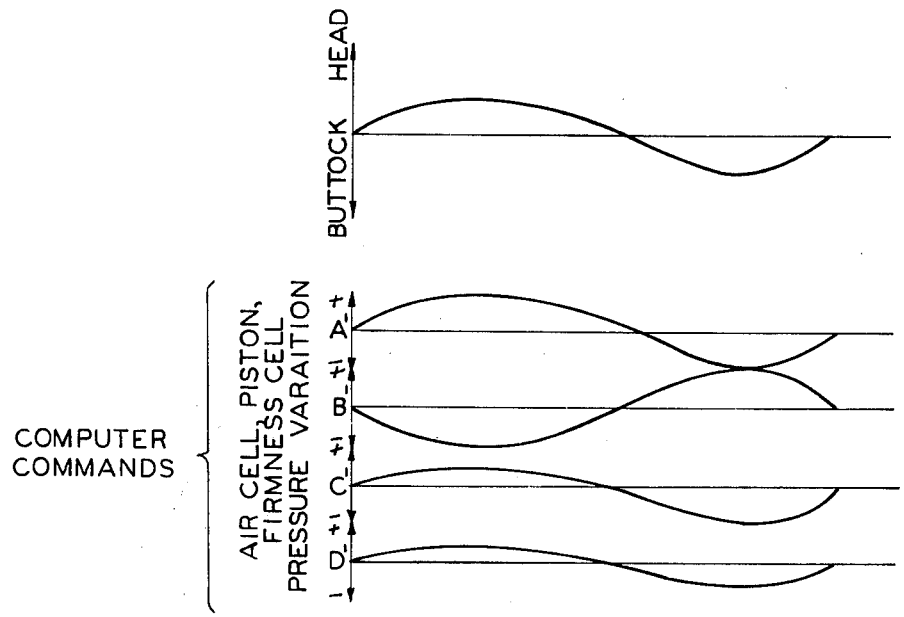
FIG. 9 shows the drive profiles for a typical acceleration.

FIG. 9 shows a typical acceleration and the corresponding computer commands A', B', C' and D'. As headward acceleration increases, signal A' also increases to impart the desired firmness to firmness cell 13. Signal B' decreases to cause the subject to sink in the seat. Signal C' and D' both increase causing lap belt and shoulder harness pressure to decrease. Examination of the figure will show that the reverse is true for acceleration in the opposite direction.

Figure 11:
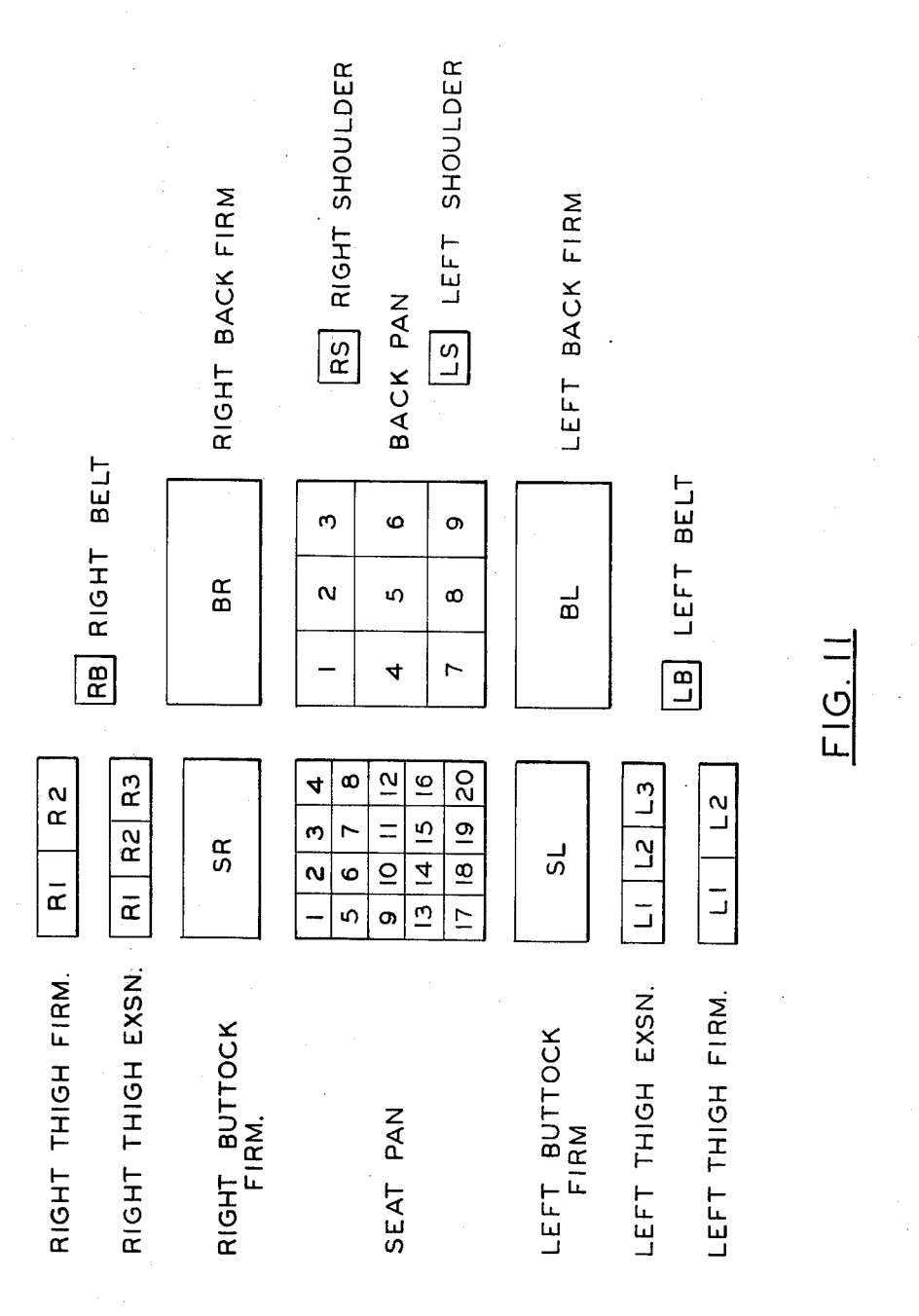

FIG. 10 is a chart showing typical pressures and temperatures applied to each component of the seat for various maneuvers and is self-explanatory. A key to the numbered components is given by FIG. 11.

The seat pan firmness cells described above require relatively high pressure drives in order to achieve maximum benefit. The construction of these devices is made more complicated by the necessity of withstanding pressures which may peak at approximately 50 PSIG. The back rest and side cushion firmness cells do not require such high pressures therefore the following alternate embodiment, in which lower pressure may be used, is directed only at the seat pan firmness cells.

An alternate method of subjecting the tuberosity region to varying forces thereby stimulating the pressure sensitive neural receptors located in this area is to construct firmness cells 23 of FIG. 2 in the manner previously detailed with one exception : Rather than construct a bladder of uniform thickness, the bladder thickness is contoured to the shape of the buttocks such that when inflated to maximum pressure the tuberosity protrusions just clear the lower surface of the bladder. When employing the low pressure bladder it is necessary to overlay (underlay the firmness cell) each set pan air cell with a hard, rigid surface such as thin plywood or hard board 85 as shown on FIG. 8. The squares of the resulting checker board appearing surface are free to move up and down with respect to one another along with the air cells 13 to which they may be secured.

The philosophy of driving the low pressure firmness cells differs with that previously described. The low pressure seat pan firmness cells operate on the principle that the minimum flesh pressure concentration, therefore the "softest" seat, exists when the firmness cell is fully inflated and its contour closely matches that of the buttocks. In this situation the subjects weight is distributed across the total area of his buttocks. As the cell deflates, the tuberosity region is the first part of the buttocks to come in contact with the rigid surface underlayment beneath the firmness cell. Continued deflation removes additional support from under the buttocks and causes the pressure in the tuberosity region to increase. It is noted that the body excursions during this process are minimum; the device is designed solely to stimulate the pressure sensitive neural receptors, not to produce notable body excursion. The latter capability is provided by the air cells 13 supporting the hardboard squares 85 and the firmness cells 23.

Now considering the acceleration example discussed earlier when buttocks to head acceleration is sensed the seat pan air cells 13 deflate and the low pressure firmness cells 23 deflate a proportional amount. Note that this concept permits partial stimulation of the pressure sensitive neural receptors in the tuberosity area with only partial body excursion capability employed. That is to say that if the above acceleration profile increases in magnitude, additional body excursions and firmness cell capability are available. Equally as important is the fact the body excursion and firmness capabilities are independent therefore one may be used without constraining the other.

In summary, the neural riceptor augmented G seat system offers many advantages.

It eliminates the interference of contrary motion cues produced by pressure G seats; it causes the two sources of motion simulation, excursion in the seat and pressure sensitive neural receptor feedback, to be compatible for a given acceleration profile and, consequently, reinforce one another; it permits the capability of enhancing and reinforcing the pressure sensitive neural receptor feedback by misleading this sensor to believe it is under greater or lesser pressure than actual; and it permits reinforcement of pressure sensation by artifically providing associative stimulus/sensation.

Finally, by employing the neural receptors in an active role by the aforementioned methods, the informational content of long term (sustained) acceleration is more nearly matched. Present G seat designs attempt to accomplish this solely with body reorientation within the seat wherein the informational content is good during the onset or tail off phase of the acceleration profile but may leave much to be desired during the steady state portion of the profile during which realism decays as the subject attempts to confirm his initial acceleration analysis by sensing continuing stimuli.

Although specific embodiments of the inention have been described herein, it will be obvious to those skilled in the art that various modifications may be made without departing from the spirit of the invention which is intended to be limited solely by the appended claims.

I claim:

1. Apparatus for providing an occupant of a vehicle simulator with a realistic sensation of G forces associated with a particular vehicular maneuver or motion, comprising:
   a. a seat for said occupant comprising:
      1. a supporting structure;
      2. a plurality of inflatable air cells arranged in side-by-side relationship on said supporting structure, said air cells supporting the body of said occupant, the degree of inflation of said air cells being controllable to cause body excursion, and
      3. a plurality of inflatable firmness cells, each of said firmness cells being located between different air cells and said occupant to independently apply pressure to selected portions of the body of said occupant, the degree of inflation of said firmness cells being controllable to selectively vary said applied pressure.
   b. coordination means for generating coordinated command signals representative of degrees of inflation of said air and firmness cells which will produce a compatible body excursion and applied pressure variation comparable to that experienced during said particular vehicular maneuver or motion; and
   c. means for selectively inflating and deflating said air cells and firmness cells in response to said command signals, whereby said compatible body excursion and applied pressure variation provide said realistic sensation of G forces to the occupant of said seat.

2. The invention according to claim 1 wherein said means for inflating and deflating comprises:
   a. a source of air at a fixed pressure; and
   b. a plurality, equal in number to the sum of the air cells and said firmness cells, of individually controllable servo valves having said source as an input and supplying their outputs to corresponding ones of said firmness and air cells.

3. The invention according to claim 1 wherein said plurality of firmness cells comprise a total of eight firmness cells which are a right and a left buttock cell, a right and a left back cell, forward and aft right thigh cells, and forward and aft left thigh cells.

4. The invention according to claim 1 wherein said seat is provided with a lap belt and shoulder harnesses and further including means comprising pistons attached to the ends thereof and means to control said pistons to vary the pressure exerted on said occupant by said belt and harnesses in coordination with the inflation and deflation of said air and firmness cells.

5. The invention according to claim 1 wherein said firmness cells are of a uniform thickness whereby they may be inflated to simulate hardness and deflated to simulate softness.

6. The invention according to claim 1 wherein the tops of said firmness cells are of a shape to conform to the human buttocks and further including a plurality of sections of a hard material placed between said air cells and said firmness cells whereby said firmness cells may be inflated to simulate softness and deflated to simulate hardness.

7. The invention according to claim 1 and further including heat exchangers placed in two of said firmness cells at a point where they will come in contact with the tuberosity region of said occupant and means to control individually the temperature of each of said heat exchangers to induce a sensation of greater pressure by supplying heat to said exchangers and a sensation of lesser pressure by cooling said exchangers.

8. The invention according to claim 7 wherein said heat exchangers comprise fluid tight means formed into a series of capillaries having a common inlet and common outlet and said means to control temperature comprises means to supply fluid at a controlled temperature to each of said heat exchangers.

9. The invention according to claim 8 and further including a plurality of resistive heating elements inserted in each of said heat exchangers and means to supply an electrical current to said heating elements.

10. The invention according to claim 8 wherein said fluid is a liquid and said means to supply said fluid comprises:
   a. first, second, and third thermostatically controlled fluid tanks, respectively containing fluid at, below, and above body temperature;
   b. first, second, and third pumps continuously pumping said fluid from said tanks respectively to first, second, and third return relief valves having their respective inputs connected to the outputs of said pumps, and their return lines feeding back to their respective tanks; and
   c. a controllable three-way valve having said relief valves outputs as inputs and providing its output to said heat exchangers.

11. The apparatus of claim 1 wherein off loading springs are provided in said air cells to permit direct pressure control thereof.

12. In a vehicle simulator having a seat comprising a plurality of side-by-side, individually inflatable motion cells supporting a part of a seated subject's body and operable to vary the position of the seated subject to induce motion sensations similar to those experienced during operation of an actual vehicle, the improvement comprising:
   first means located adjacent to at least one of said motion cells for independently applying pressure to a selected portion of the supported part of the subject's body without producing a body excursion perceptible to said subject; and
   second means for coordinating the operation of said first means with the operation of said motion cells to produce a compatible pressure variation across said selected body portion, whereby said compatible pressure variation reinforces the position variation produced by said motion cells and, thereby, induces motion sensations more closely resembling those experienced during actual vehicle operation.

13. The improved apparatus of claim 12 wherein said first means comprises an inflatable firmness cell located between at least one of said motion cells and said subject; and
   said second means coordinates the degree of inflation of said firmness cell with the operation of said motion cells.

14. The improved apparatus of claim 12 wherein said motion cells comprise air cells and further including a spring within each of said air cells which permits direct pressure control thereof.

15. The improved apparatus of claim 12 wherein said motion cells support the seated subject's buttocks and said first means is positioned for independently applying pressure to a selected portion of the subject's buttocks.

16. A method for simulating accelerations without introducing unrealistic cues, comprising:
   seating a subject in a seat in which at least a portion of the body of said subject is supported by a dynamic component of said seat, said component comprising a plurality of individually inflatable, side-by-side air cells designed to produce variations in the position of the subject relative to the seat and an independently inflatable firmness cell located between at least one of said air cells and said subject to independently apply pressure to at least one selected section of said suppported body portion;
   altering the degree of inflation of at least one of said plurality of side-by-side air cells to vary the position of the subject relative to the seat;
   altering the degree of inflation of said firmness cell to vary the pressure applied to said selected section of the supported body portion; and
   coordinating said alterations in inflation in a manner which provides the seated subject with compatible body excursion and flesh pressure cues for the particular acceleration sought to be simulated.

17. The method of claim 16 further including the sensor misleading step of:
   applying a non-pressure sensory stimulus to said selected section of the supported body portion to induce a variation in the subject's perception of applied pressure.

18. The method of claim 17 whrein said sensor misleading step comprises:
   artificially controlling the temperature of at least a spot on said body section to vary perceived pressure.

19. A G-seat for use in simulating vehicular motion and maneuvers, comprising:
   a. dynamic seat means comprising:
      1. a surface for supporting the buttocks of a seated subject,
      2. first means for selectively altering the elevation and attitude of said surface to produce a desired body excursion of said seated subject, and
      3. a firmness cell located between said surface and a buttock of said subject for varying perceived seat hardness; and
   b. second means for coordinating the operation of said first means and said firmness cell to produce body excursions and variations in perceived seat hardness comparable to those experienced in an operational vehicle.

20. The G-seat of claim 19 wherein said dynamic seat means further includes a hard, rigid member located between said firmness cell and said surface.

21. The G-seat of claim 17 wherein said first means comprises a plurality of side-by-side inflatable cells, the top portions of said cells defining said buttocks-supporting surface.

* * * * *

UNITED STATES PATENT AND TRADEMARK OFFICE
CERTIFICATE OF CORRECTION

PATENT NO. : 4,059,909
DATED : November 29, 1977
INVENTOR(S) : Gerald J. Kron

It is certified that error appears in the above-identified patent and that said Letters Patent are hereby corrected as shown below:

Col. 3, line 45, "For" should be --Four--.

Col. 7, line 21, "minimum" should be --minimal--.

Col. 7, line 36, insert --that-- before "the".

Col. 7, line 50, "artifically" should be --artificially--.

Signed and Sealed this

Twenty-first Day of March 1978

[SEAL]

Attest:

RUTH C. MASON
Attesting Officer

LUTRELLE F. PARKER
Acting Commissioner of Patents and Trademarks